United States Patent [19]

Breon et al.

[11] Patent Number: 4,826,470
[45] Date of Patent: May 2, 1989

[54] FLUID OPERATED CHAIN OR BELT TENSIONING DEVICE

[75] Inventors: Mark S. Breon; Bryce A. Buuck; Leslie L. Ecklund, all of Battlecreek, Mich.

[73] Assignee: Eaton Corporation, Cleveland, Ohio

[21] Appl. No.: 217,901

[22] Filed: Jul. 1, 1988

[51] Int. Cl.[4] .............................................. F16H 7/12
[52] U.S. Cl. .................................. 474/110; 474/136; 474/138
[58] Field of Search ............... 474/101, 109, 110, 111, 474/136, 138

[56] References Cited

U.S. PATENT DOCUMENTS 3,960,026  6/1976  Hibino .................................. 474/110
4,504,251  3/1985  Mittermeier ........................ 474/110

Primary Examiner—Thuy M. Bui
Attorney, Agent, or Firm—A. E. Chrow

[57] ABSTRACT

A hydraulically operated chain or belt tensioner is provided which in a preferred embodiment (500) features a piston or dynamic plunger (56) slidably received within a bore (54) of a housing (52) that includes a fluid chamber (65) that is vented by at least one air vent (76) extending through housing (52) that is oriented relative bore (54) such that tensioner (500) can be rotated a predetermined angular amount alpha relative horizontal with vent (76) maintaining a slope (B) greater than zero enabling entrapped air to escape from chamber (64) and preventing a substantial amount of fluid to drain therefrom by gravity when unpressurized.

9 Claims, 3 Drawing Sheets

PRESSURIZED FLUID SOURCE

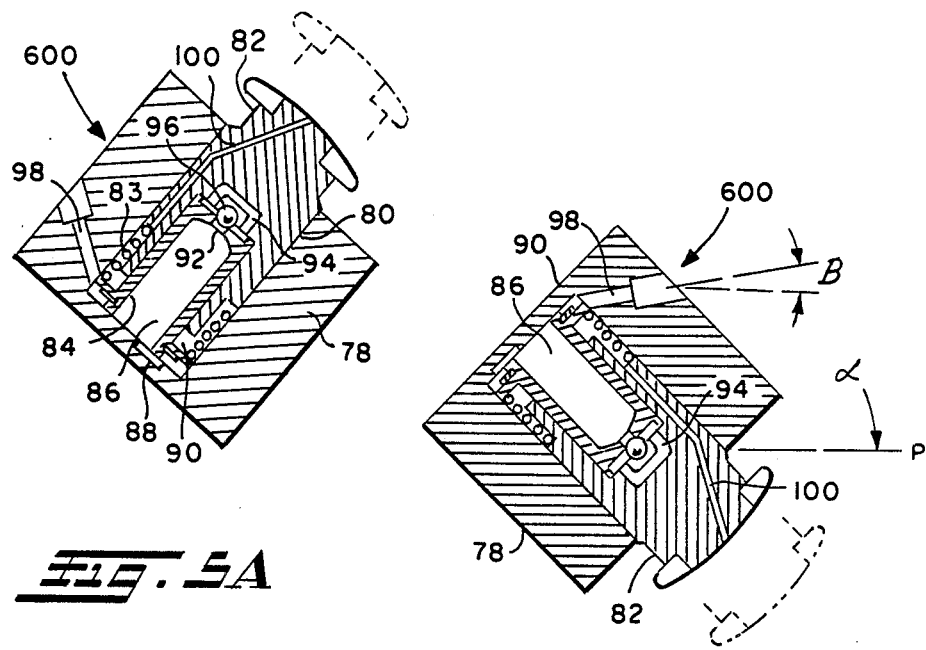
FIG. 5A
FIG. 5B
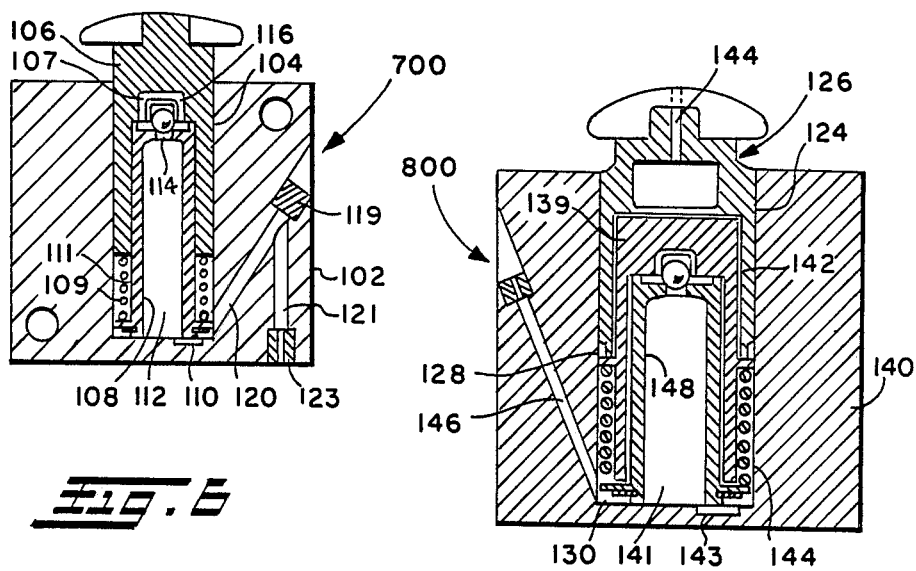
FIG. 6
FIG. 7

FLUID OPERATED CHAIN OR BELT TENSIONING DEVICE

INTRODUCTION

This invention relates generally to a pressurized fluid operated device for tensioning an endless roller chain or belt and more particularly to such device including at least one air vent oriented so as to enable the device to be transversely rotated a predetermined angular amount relative a horizontal plane whilst remaining operative to enable entrapped air to escape from the pressurized fluid and preventing the fluid when not pressurized to drain from the device under gravity in any substantial amount.

BACKGROUND OF THE INVENTION

A great many hydraulic devices have been developed over the years for tensioning endless roller chains and belts particularly in vehicular applications. Some prior art devices feature a pressurized fluid operated piston whose exposed end has been adapted to engage the chain or belt without unduly inhibiting its movement and is operative to displace the chain or belt transversely to tension it as the piston rod is caused to move towards the chain or belt in response to pressurized fluid being conveyed into the piston chamber. Other prior art devices include resilient biasing means such as a coiled spring in the piston chamber to either urge the piston rod towards the chain or belt in conjunction with the pressurized fluid or in some cases to urge the piston rod in an opposite direction to lessen the force of the pressurized fluid on the piston rod so that the roller chain or belt is not over tensioned. Generally, in such cases, the fluid selected is an incompressible fluid such as oil which acts as an incompressible medium within the fluid reservoir.

It has also been common practice to include a high pressure fluid chamber within the piston that receives an incompressible fluid such as oil from the fluid reservoir through an opening therebetween having a one-way check valve. Such devices operate on the principle employed for automotive fluid operated slack adjusters or valve lifters where, when no load is applied against the end of the device, the combination of a coiled spring and the fluid in the reservoir urge the piston against the valve cam or rod whilst the check valve enables the fluid to flow from the reservoir into the high pressure chamber until the fluid pressure within the high pressure chamber is the same as the fluid pressure in the reservoir at which point the check valve closes and seals the fluid in the high pressure chamber to act as incompressible fluid medium against which the cam or rod acts during its rotational cycle or stroke. The fluid pressure in the high pressure chamber will subsequently decrease due to the enlargement of the high pressure chamber arising by movement of the piston towards the rod or cam and/or due to leakage until it falls below the fluid pressure in the reservoir which again causes the check valve to open and enable the fluid to pass from the reservoir into the high pressure chamber to provide cyclic recharging of fluid in the high pressure chamber.

One of the problems associated with the use of such hydraulic tensioning devices is purging air from the piston chamber while it is being filled with the fluid and to enable entrapped air to escape from the piston chamber while it is operating, for air is compressible and may adversely affect the operation of the device.

Although it has been common practice to provide an air vent on the back side of a hydraulically operated piston to prevent the air from being compressed, little has been done in providing an air vent communicating directly with the pressurized fluid chamber itself.

An example of a hydraulic belt tensioner utilizing a singular air vent communicating with the center of a pressurized fluid chamber is disclosed in U.S. Pat. No. 4,276,038, the disclosure of which is incorporated herein by reference. In this case, the air vent enters the clearance between the piston and the surrounding bore and would necessarily be limited in its effectiveness according to orientation of the device.

An example of a hydraulic belt tensioner having only a singular fluid exhaust port at the exposed end of the piston which is plugged after the device is filled with oil is disclosed in U.S. Pat. No. 4,277,240, the disclosure of which is incorporated herein by reference. Here, however, no air vent enters the main pressurized fluid chamber and no provisions are made to vent air that may be entrapped in the pressurized fluid whilst the device is operating. A similar concept is disclosed in U.S. Pat. No. 4,283,181, the incorporation of which is included herein by reference and which also teaches the use of an air vent on the back side of the piston to prevent air from being compressed during the pressurized stroke of the piston.

An example of a closed hydraulic chain tensioning device featuring a hollow piston that enables air to escape while the piston is being initially filled with fluid and which is then plugged is disclosed in U.S. Pat. No. 4,504,251, the disclosure of which is incorporated herein by reference. Here, however, no provision is made to vent air that may be entrapped in the fluid during operation of the device.

An example of a tensioning device utilizing an opening to vent air on the backside of a cylinder is disclosed in U.S. Pat. No. 4,674,996, the disclosure of which is incorporated herein by reference. Again, however, no provision is made to vent entrapped air in the pressurized fluid while the device is operating.

The chain or belt tensioning device of the present invention not only enables entrapped air to be vented when it is being filled with the fluid and during its operation but also enables a broad orientation range of the device relative a horizontal plane without an appreciable amount of the fluid draining therefrom under gravity when not pressurized.

SUMMARY OF THE INVENTION

Accordingly, it is an object of this invention to provide a pressurized fluid roller chain or belt tensioning device that is operative to vent air from the device while it is being filled with the fluid and during its operation.

It is another object of this invention to provide a hydraulic roller chain or belt tensioning device that effectively vents entrapped air during its filling with the fluid and during its operation in a broad range of positions relative a horizontal plane as well as preventing the fluid when not pressurized from draining under gravity therefrom in any substantial amount.

BRIEF DESCRIPTION OF THE DRAWINGS

FIGS. 5A and 5B are cross-sectional views of respective orientations of a tensioning device 600 of the invention;

FIGS. 6–7 are respective cross-sectional views through tensioning devices 700 and 800 of the invention.

DESCRIPTION OF SOME PREFERRED EMBODIMENTS

Figure 1:
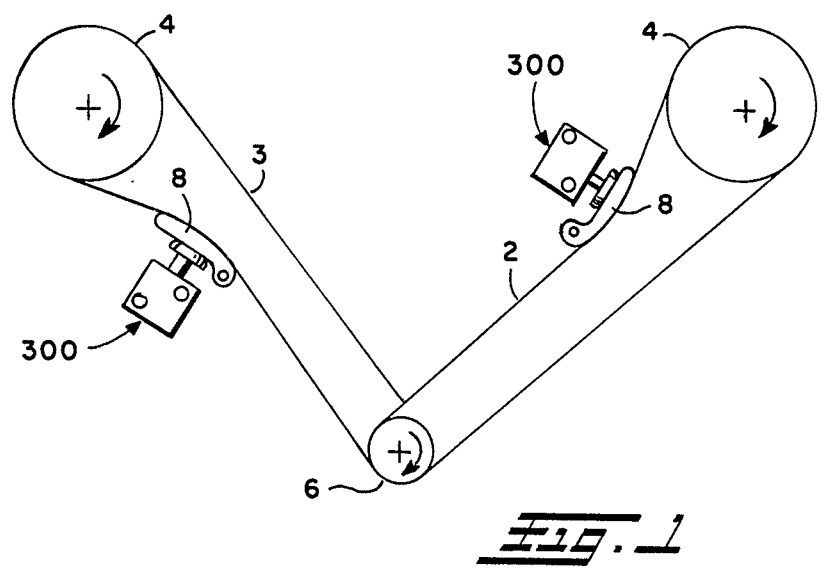
FIG. 1 is a front view of an overhead cam engine application having a belt or roller chain tensioned by device 300 of the invention.

FIG. 1 shows a vehicular engine application for which the tensioning device of the invention can be used to great advantage.. FIG. 1 shows an engine crank shaft 6 driving a pair of spaced-apart cam shafts 4 by means of belt or roller chains 2 and 3. Since crank shaft (6) and cam shafts (4) are normally fixed in their locations, it is likely that, although originally suitably tensioned, roller chains or belts 2 and 3 will loosen after a period of time due to stretching and wear of either the chain or belt and/or the sheaves or sprockets employed with the belt or roller chain.

Figure 2:
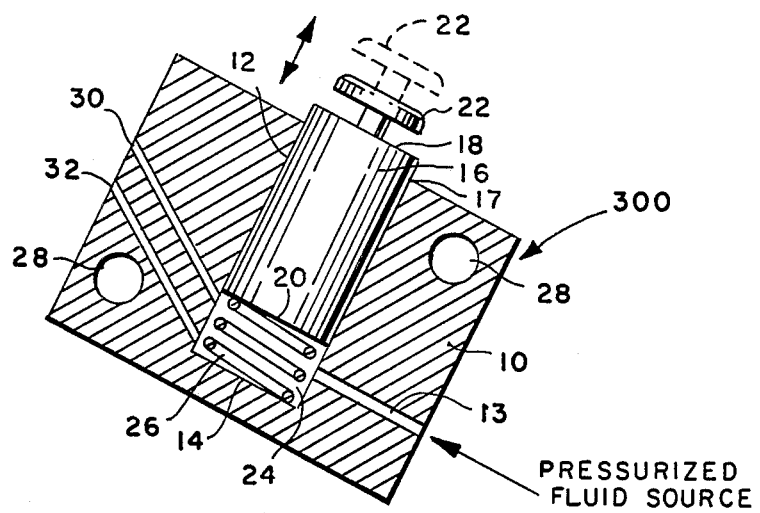
FIG. 2 is a partial central cross-sectional view of device 300 of FIG. 1.

In order to impart and maintain tension on belt or chains 2 and 3, two tensioning devices 300, hereinafter described with respect to FIG. 2, are employed in two different orientations relative a horizontal plane that are respectively operatively engaged with a pivotable paddle 8 and are effective to pivot paddle 8 and move chains or belts 2 and 3 in a direction and for a distance sufficient to maintain a suitable tension thereon.

Thus, within certain predetermined dimensional limits, the device of the invention will automatically take up slack in belts or roller chains 2 and 3 due to stretch and wear and is further operative to be transversely rotated a predetermined angular amount relative a horizontal plane whilst enabling entrapped air to escape from a pressurized fluid reservoir therewithin without enabling a substantial amount of fluid to drain from the device by gravity when not pressurized to vastly increase its versatility and usefulness in a variety of applications.

Fluid operated devices made in accordance with the invention commonly are able to vent air that may be entrapped in their respective fluid reservoir chambers through the clearance between the bore wall and the outer periphery of their respective dynamic plungers or pistons when the piston is within a prescribed position range relative vertical but which further include at least one vent extending through the body of the device that preferably angularly intersects the fluid chamber and enables entrapped air to be vented from the chamber when the device is rotated a predetermined angular amount relative a horizontal plane as hereafter described.

In FIG. 2, device 300 perhaps illustrates the invention in one of its simplest forms. Device 300 has a body member 10 having a pair of spaced-apart openings or holes 28 therethrough for bolting it to a frame. Although holes 28 through body member 10 are preferred for mounting, any suitable means may be employed for mounting the body member of the tensioning device of the invention to a frame such as a cylinder head or engine block. Body member 10 has a bore 12 therein having an open end 17 and a closed end 14. A dynamic plunger 16 is slidably received in bore 12. Plunger 16 has an exposed end 18 and an opposite end 20 within bore 12 and spaced-apart from closed end 14 to define a first fluid pressure chamber or reservoir 24 within bore 12 therebetween. Means such as passageway 13 is provided in body member 10 for conveying pressurized fluid from a pressurizing source such as a pump into chamber 24 as shown in FIG. 2. In vehicular applications the fluid pressure is commonly in the range of 10 to 70 psig.

Exposed end 18 of plunger 16 is operatively engaged with the chain or belt, in this case, by means of pedestal 22 secured thereto which is shaped to engage paddle 8 as hereinbefore described with respect to FIG. 1. The extended position of pedestal 22 is shown in dashed line form and generally is a function of the stroke of plunger 16 which in turn is a function of the length of both bore 12 and plunger 16.

Device 300 preferably includes a resilient biasing means such as coiled spring 26 in chamber 24 that operates to urge plunger 16 away from closed end 14 of bore 12 to assist the fluid pressure in tensioning the chain or belt.

Once chamber 24 is filled with pressurized fluid such as oil, it acts as an incompressible fluid against which paddle 8 acts to maintain tension on the chain or belt.

Body member 10 includes a pair of spaced-apart air vents 30 and 32 that respectively angularly intersect opposite ends of chamber 24 and are oriented relative bore 12 in such a manner that device 300 can be rotated transversely a predetermined angular amount relative a horizontal plane such as shown in FIG. 1, with at least one of vents 30 and 32 operable to enable entrapped air to escape from chamber 24 whilst neither enables a substantial amount of the fluid, when not pressurized, to drain from chamber 24. In the rotated position of device 300 shown on the viewer's right in FIG. 1, vent 32 is operable to vent entrapped air from chamber 24 and the slope of both vents 30 and 32 relative horizontal is greater than zero allowing air to travel upwardly and out from chamber 24 while preventing the fluid from draining from chamber 24 by gravity when not pressurized.

Thus, during operation, pressurized fluid is vented by both vents 30 and 32 and entrapped air is vented by at least one of vents 30 and 32 and neither operate to enable unpressurized fluid to drain from chamber 24 by gravity whilst device 300 is within a predetermined orientation range relative a horizontal plane.

Such is of great advantage for it enables the same device to be used in a variety of orientations relative a horizontal plane such as the left and right positions shown in FIG. 1 as well as insuring that chamber 1 remains substantially filled when the fluid is not under pressure such as when the engine stops which in turn would stop the fluid pressurizing pump.

Figure 3:
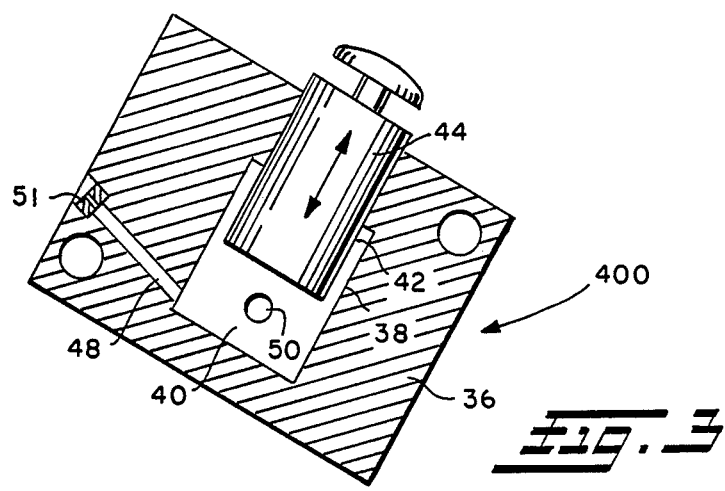
FIG. 3 is a partial central cross-sectional view through a device 400 of the invention.

In FIG. 3, tensioning device 400 has a body member 36 provided with an open ended bore 38 in which dynamic plunger 44 is slidingly received. The operation of device 400 is essentially the same or for device 300 hereinbefore described. Plunger 44 is spaced-apart from the closed end of bore 38 to provide a first fluid chamber or reservoir 40 therebetween. Pressurized fluid enters chamber 40 through opening 50. An annular space 42 is provided between the outer periphery of plunger 44 and the inner surface of body member 36 surrounding bore 38. Space 42 is in fluid communication with chamber 40 and forms a part thereof. An air vent 48 intersects chamber 40 adjacent the closed end of bore 38 such that device 400 can be transversely rotated a predetermined angular amount relative a horizontal plane with vent 48 maintaining a slope B greater than zero and remaining operable to vent entrapped air from chamber 40 and to prevent a substantial amount of the fluid to drain from chamber by gravity when unpressurized. Vent 48 preferably includes a flow restrictor 51 for minimizing the flow of pressurized fluid through vent 48 when device 400 is operating with pressurized fluid in chamber 40.

Figure 4A:
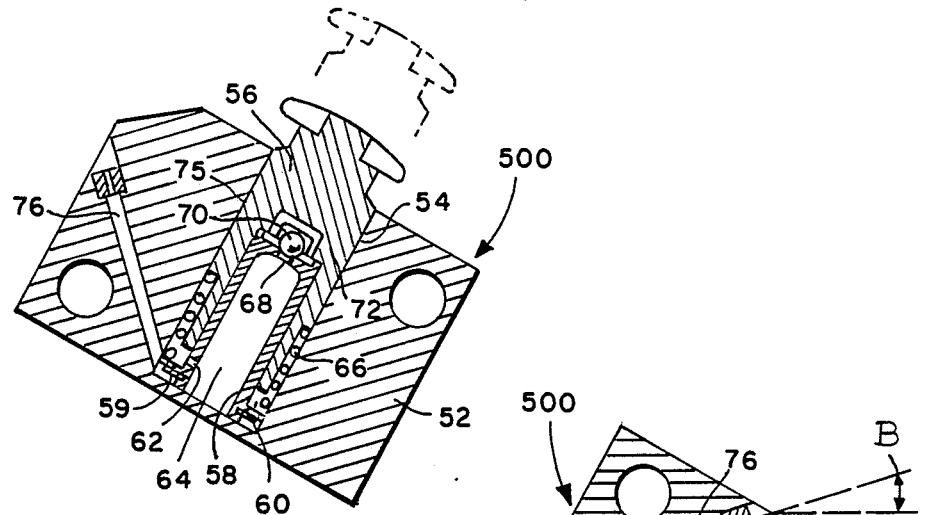
FIGS. 4A and 4B are cross-sectional views of respective orientations of a tensioning device 500 of the invention.
Figure 4B:
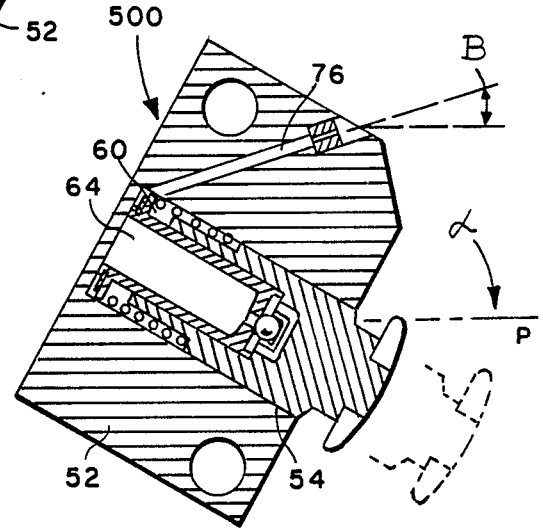

A preferred embodiment of the invention in the form of tensioning device 500 is shown in FIGS. 4A and 4B. In FIG. 4B, device 400 has been rotated clockwise by angle alpha relative horizontal plane "P" from the position shown in FIG. 4A Device 500 has a body member 52 having a close-ended bore 54 therein in which dynamic plunger 56 is slidably received. Plunger 56 has a close-ended bore (not referenced) in the end thereof facing towards the closed end of body member bore 54. The end of plunger 56 is spaced-apart from the closed end of bore 54 to define a first fluid chamber 60 therebetween. A static plunger 58 having a hollow interior 64 is stationarily disposed within chamber 60 with a portion thereof extending into the dynamic plunger 56 bore and spaced-apart from the bottom thereof to define a second fluid chamber or reservoir 72 therebetween.

An opening 62 through the wall of static plunger 58 provides fluid communication between chamber 60 and hollow interior 62.

An opening 68 in the wall of static plunger 58 provides fluid communication between chamber 72 and hollow interior 64. A resilient check valve 70 is provided that operates to enable pressurized fluid to flow from hollow interior 64 into chamber 72 when dynamic plunger 56 is moving away from stator plunger 58 which creates a vacuum in chamber 72 resulting in check valve 10 opening to allow fluid to flow from hollow interior or reservoir 64 into chamber 72.

Static plunger 58 is provided with an integral flange or a washer 59 supported by a snap-ring, that extends radially outwardly from its outer periphery providing a surface upon which to rest an end of a resilient biasing means such as coiled spring 66 whose opposite end engages an end of plunger 56 within bore 54. Spring 66 operates to both urge plunger 58 away from the closed end of bore 12 and to urge static plunger 58 thereagainst to provide the stationary relationship therefore relative bore 12. Other means may be used to secure static plunger 58 stationarily within bore 12. A space 75 is provided between the outer periphery of dynamic plunger 56 and the surface of body member 52 surrounding bore 12. Space 75 is in fluid communication with chamber 60 and forms a part thereof.

Although not shown, a means is provided for conveying pressurized fluid into chamber 60 which in turn then flows through opening 62 into hollow interior 64 which acts as a reservoir for chamber 72 into which the pressurized fluid flows when its pressure exceeds that in chamber 72 by a predetermined amount.

Device 500 includes an air vent 76 that angularly intersects chamber 60 adjacent the closed end of bore 54. Vent 76 is respectively oriented relative bore 12 such that device 400 can be transversely rotated an angle alpha relative horizontal plane "P", as shown in FIG. 4B whilst maintaining a slope B greater than zero and remaining operable to vent entrapped air from chamber 60 and preventing a substantial amount of fluid to drain under gravity from either chamber 60 or hollow interior 64 when unpressurized.

Device 600 of FIGS. 5A and 5B has a body member 78 having a close-ended bore 80 therein in which a dynamic plunger 82 is slidably received. The end of plunger 82 within bore 80 is spaced-apart from the closed end thereof to define a first fluid chamber or reservoir 90 therebetween. A static plunger 84 having a hollow interior 86 is stationarily secured within chamber 90 and a means is provided (not shown) for conveying pressurized fluid into chamber 90 which in turn flows into hollow interior 86 through a depression such as a slot or groove 88 in the closed end of bore 80. A resilient coiled spring 83 is disposed within chamber 90 which operates to urge dynamic plunger 82 away from the closed end of bore 80 as well as urge static plunger 84 against the closed end of bore 80 to provide the stationary relationship therefor.

A portion of static plunger 84 extends into a close-ended bore, not referenced, in dynamic plunger 82 and is spaced-apart therefrom to define a second high pressure fluid chamber 94 therebetween. An opening 92 is provided between chamber 94 and hollow interior 86, and a check valve 96 is included which controls pressurized fluid flow between hollow interior 86 and chamber 94 as previously described for device 500.

A first air vent 98 angularly intersects chamber 90 adjacent the closed end of bore 80 and a second air vent 100 extends through dynamic plunger 80 between chamber 90 and the exposed end of plunger 80. Vent 100 is operable to convey both entrapped air and pressurized fluid to the exposed end of plunger 100 which may, for example, be used to lubricate a roller chain being tensioned by device 600.

Vent 98 is oriented relative bore 80 to enable device 600 to be rotated a predetermined angular amount alpha relative a horizontal plane "P" with vent 98 maintaining a slope B greater than zero and remaining operable to enable entrapped air to escape from chamber 90 and preventing a substantial amount of fluid to drain by gravity from either chamber 90 or hollow interior 86 when the fluid is not in a pressurized state.

Device 700 of FIG. 6 has a body member 102 having a close-ended bore 104 in which dynamic plunger 106 is slidably received. The end of plunger 106 is spaced-apart from the closed end of bore 104 to define a first fluid chamber 111 therebetween. A static plunger 108 having a hollow interior or fluid reservoir 112 is stationarily disposed within chamber 111 by means of coiled spring 109 which operates to urge static plunger 108 and dynamic plunger 106 away from each other as previously described.

A depression such as a slot or groove 110 in the closed end of bore 104 enables pressurized fluid to flow between chamber 111 and hollow interior 112 from a pressurized fluid source (not shown). A portion of static plunger 108 extends into a close-ended bore (not referenced) in plunger 106 facing towards chamber 111 and is spaced-apart from the closed end thereof to define a second high pressure fluid chamber 107 therebetween.

An opening 114 and check valve means 116 enable pressurized fluid to flow from hollow interior 112 into chamber 107 as hereinbefore described.

Device 700 has an air vent 120 that angularly intersects chamber 111 adjacent the closed end of bore 124 and exits at the right side of body member 102. Vent 120 is plugged at its exit from body member 102 by suitable means such as plug 119 as shown in FIG. 6. A second vent or branch 121 of vent 120 extends from an exit at the bottom of body member 102 in substantial parallel alignment with the axis of bore 104 and intersects vent 120 as shown in FIG. 6 to provide a "knee" between vents 120 and 121. A fluid flow restrictor 123 is preferably included at the exit of vent 121 at the bottom of body member 102.

Such arrangement imparts great versatility in the use of device 700. For example, plug 119 may be removed from vent 120 and flow restrictor 123 replaced with a plug such that device 700 is operable to be rotated a predetermined angular amount relative horizontal with the slope of vent 120 remaining greater than zero enabling vent 120 to vent entrapped air from chambers 111 and 112 yet operable to prevent a substantial amount to drain therefrom under gravity when unpressurized.

More particularly, the arrangement in FIG. 6, where vent 120 is plugged and vent 121 is not, can be used to particular advantage in tensioning short cam to cam chain drives in dual overhead cam engines where device 700 is positioned within the loop of the chain. In such application, device 700 can be rotated toward the viewer's left such that the included angle between the axis of bore 104 and horizontal is about 45 degrees for tensioning the chain drive between the left bank of cams when viewed from the front of the engine and also can be rotated 180 degrees about the axis of bore 104 and then rotated towards the viewer's right such that the included angle between the axis of bore 104 and horizontal is about 45 degrees for tensioning the short chain between the right bank of cams of the dual overhead cam engine.

In both the left or right position, the slope of vent 120 relative horizontal is greater than zero enabling entrapped air to vent through vent 121 from chamber 111 and 112 and yet prevent a substantial amount of fluid to drain therefrom under gravity when not pressurized whilst enabling pressurized fluid to flow from the exit of vent 121 at the bottom of device 700 for lubricating the chain as it passes the bottom of device 700.

Device 800 of FIG. 7 is similar to device 600 previously described except that it has a dynamic plunger 126 having a composite wall construction featuring an inner portion 139 separated from an outer section 124 by a space 142 which is operative to receive pressurized fluid from opening 128 and convey it to a vent 144 in portion 126 which then conveys it to the exposed end of plunger 126, for example, for lubrication purposes. Such composite construction eliminates the complexities of drilling or casting the air vent in the dynamic plunger and is effective to provide greater flow rate of the pressurized fluid through the dynamic plunger.

An air vent 146 agularly intersects a first fluid chamber 130 adjacent the closed end of bore 144 in body member 140. A depression such as a slot or groove 143 in the closed end of bore 144 enables pressurized fluid to flow from chamber 130 into hollow interior or reservoir 141 of static plunger 148.

Vent 146 is oriented relative bore 144 to enable device 800 to be transversely rotated a predetermined angular amount relative horizontal whilst maintaining a slope greater than zero and remaining operable to enable entrapped air to escape from chambers 130 and 141 yet prevent a substantial amount of fluid to drain under gravity therefrom when unpressurized.

What is claimed is:

1. An improved fluid operated endless chain or belt tensioning device of the type comprising a body member having a bore therein having an open end and a closed end, a dynamic plunger slidably received in the body member bore, said dynamic plunger having an exposed end operatively engaging the chain or belt for the tensioning thereof and having an opposite end within the body member bore in spaced-apart relationship with the closed end thereof defining a first fluid chamber therebetween, and means enabling the pressurized fluid to enter the first chamber and urge the dynamic plunger away from the body member closed end and cause the chain or belt to be displaced in a direction for a distance effective for the tensioning thereof, said improvement characterized by said device including at least one vent extending through the body member and intersecting the first chamber, said vent oriented relative the body member bore such that the exit thereof from the body member is higher than the intersection thereof with the first chamber when the body member bore is in an upright vertical position by an amount effective to enable the device to be transversely rotated a predetermined angular amount relative a horizontal plan whilst enabling entrapped air to escape from the first chamber and preventing a substantial amount of the fluid to drain therefrom by gravity when not pressurized.

2. The device of claim 1 wherein the first chamber includes a space between the outer periphery of the dynamic plunger and the surface of the body member surrounding the body member bore.

3. The device of claims 1 or 2 including resilient biasing means disposed within the first chamber and operative to urge the dynamic plunger away from the body member bore closed end.

4. The device of claim 1 wherein the dynamic plunger includes a close-ended bore extending thereinto from the opposite end thereof and a static plunger having a hollow interior is stationarily disposed within the first chamber with a portion thereof extending into the dynamic plunger bore and defining a second fluid chamber within the dynamic plunger bore between the closed end thereof and the static plunger, at least one opening providing fluid communication between the first chamber and the static plunger hollow interior enabling the pressurized fluid to flow thereinto from the first chamber, an opening providing fluid communication between the second fluid chamber and the static plunger hollow interior, and check valve means operative to enable pressurized fluid to flow into the second fluid chamber from the static plunger hollow interior through the opening therebetween.

5. The device of claim 4 including resilient biasing means disposed within the first chamber and operative to urge the dynamic plunger away from the body member bore closed end.

6. The device of claim 5 wherein the biasing means is also operative to urge the static plunger towards the body member bore closed end to provide the stationary relationship between the static plunger and body member bore.

7. The device of claims 4, 5 or 6 including a vent that extends through the dynamic plunger between the first chamber and the exposed end thereof and is operative to enable entrapped air and the pressurized fluid to be conveyed from the first chamber therethrough and exit from the dynamic plunger exposed end.

8. A fluid operated endless chain or belt tensioning device comprising;
- a body member having a bore therein having an open end and a closed end,
- a dynamic plunger slidably received in the body member bore, said dynamic plunger having an exposed end operatively engaging the chain or belt for the tensioning thereof and having an opposite end within the body member bore in spaced-apart relationship the closed end thereof defining a first fluid chamber therebetween,
- a space between the outer periphery of the dynamic plunger and the surface of the body member surrounding the body member bore, said space in fluid communication with and comprising part of the first chamber,
- a close ended bore extending into the dynamic plunger from the opposite end thereof,
- means enabling the pressurized fluid to enter the first chamber,
- a static plunger having a hollow interior disposed within the first chamber with a portion thereof extending into the dynamic plunger bore and defining a second fluid chamber within the dynamic plunger bore between the closed end thereof and the static plunger,
- at least one opening providing fluid communication between the first chamber and the static plunger hollow interior enabling the pressurized fluid to flow thereinto from the first chamber,
- check valve means operative to enable the pressurized fluid to flow into the second chamber from the static plunger hollow interior through the opening therebetween,
- resilient biasing means disposed within the first chamber and operative to both urge the dynamic plunger away from the body member bore closed end and to urge the static plunger towards the body member closed end to provide a stationary relationship therefor relative the body member bore, and
- at least one vent extending through the body member and intersecting the first chamber, said vent oriented relative the body member bore such that the exit thereof from the body member is higher than the intersection thereof with the first chamber when the body member bore is in an upright vertical position by an amount effective to enable the device to be rotated a predetermined angular amount relative a horizontal plane whilst enabling entrapped air to escape from the first chamber and preventing a substantial amount of the fluid to drain therefrom by gravity when not pressurized.

9. The device of claim 8 including a vent that extends through the dynamic plunger and is operative to both enable entrapped air to exit from the first chamber and to enable the pressurized fluid to flow therethrough from the first chamber and exit from dynamic plunger exposed end.

* * * * *